SOLID STATE PLASMA MASER

Filed Nov. 25, 1966

INVENTORS
JOSEPH FEINSTEIN
MARCEL W. MULLER
BY John C Randa

United States Patent Office 3,533,011

Patented Oct. 6, 1970

3,533,011
SOLID STATE PLASMA MASER

Joseph Feinstein, Menlo Park, Calif., and Marcel W. Muller, University City, Mo., assignors to Varian Associates, Palo Alto, Calif., a corporation of California Filed Nov. 25, 1966, Ser. No. 596,961
Int. Cl. H01s *1/02, 3/09*
U.S. Cl. 331—94 8 Claims

ABSTRACT OF THE DISCLOSURE

This disclosure relates in general to the field of high frequency amplifiers and generators utilizing solid state plasmas for generating electromagnetic wave energy via what can be termed an anharmonic oscillation process occurring between the Landau levels of the carriers in a solid state plasma.

More specifically, the invention provides a simple cross-field DC pumping mechanism for creating population inversions or a negative temperature state between unequally spaced Landau levels in a solid state plasma confined in generally planar shaped slab, plate or thin film maser medium. The DC pumping field may be applied by a simple DC source, e.g., a battery or pulse generator or may alternatively be applied by an RF pumping mechanism with the restriction that the pumping frequency be much less than the maser operating frequency.

The invention provides further a method for reducing the magnitude of the required pumping field and for reducing the dissipation of energy in the solid state medium by means of a novel application of the Hall effect in generally planar shaped thin plates or films of the solid state medium. The invention provides further a novel method for confining the electromagnetic radiation that interacts with the solid state medium in such a manner as to utilize more fully the active properties of the medium and to reduce losses.

The present invention also shows that inelastic collision processes between carrier electrons and lattice defects and phonons of the maser medium under the influence of an applied DC E field will produce the required motions in a crossed field to correspond to the different Landau levels such that a population inversion is possible in a solid state plasma using DC crossed field pumping.

The potential fields of usage for solid state masers operating according to the teachings of the present invention are to mention only a few, millimeter and submillimeter radar applications, spectroscopy, etc.

A few specific embodiments of a maser in accordance with the teachings of the present invention are presented. In the specific embodiments the DC crossed field pumping mechanism is supplied by a steady DC H field oriented in the major plane of the thin film maser vehicle in combination with an applied orthogonal E field component which also lies in the major plane of the thin film maser vehicle. The E field component may be supplied by a simple DC or pulse or may be supplied by a suitable resonont cavity electromagnetic field in the form of an RF pumping mechanism which operates at a frequency much less than the maser operating frequency. The requirements of obtaining a population inversion in a solid state maser vehicle between Landau levels (cyclotron resonance levels) in the conduction band of a semiconductor and/or in a semimetal can be met by satisfying the following relationship at the operating angular frequency of the device $\omega=\omega_c$ $$|\alpha|E_0\tau>1$$

where $$\alpha=d\omega_c/dE_0$$

is the energy dependence of $\omega_c$ (a measure of the anharmonicity)

$$E_0=\text{the energy}$$

of the excited carriers (conduction band electrons)

$$\tau=\text{collision lifetime}$$

of the carriers at the operating temperature of the maser vehicle. If in addition the effective masses of the carriers in the conduction band as denoted by $m^*$ are much less than the free electron mass value $m$, as we have determined to be the case for certain semimetals and semiconductors, the cyclotron frequency $\omega_c$ can be achieved at very high frequencies with low values of $H_0$ in comparison to the free electron values.

The non-parabolic shape of the conduction band structure E vs. $\bar{K}$ of the solid state maser vehicle is a requirement for unequally spaced Landau levels and the greater the curvature of the band the smaller the effective mass of of the carriers. Since the cyclotron resonance frequencies for quasi free electrons in the conduction bands of such semiconductors and semimetals like Bi, InSb, BiSb alloy with around 12% of SB as a specific example can be expressed as $$\omega_c=eH_0/m^*c$$

it is seen as stated above that the smaller the $m^*$ the higher the $\omega_c$ for a given $H_0$ which means it is possible to generate rather high frequencies, e.g., millimeter, submillimeter and infrared with rather small $H_0$ values by using the teachings of the present invention. Furthermore, by simple variation of the magnetic field strength $H_0$ the energy spacing between Landau levels will be varied while retaining their anharmonicity and a magnetically tunable solid state maser is provided.

By orienting the orthogonal crossed field pumping E and $H_0$ vectors in a manner such that they both lie in the major plane of the thin film solid state maser vehicle it is possible to achieve high internal Hall electric fields which greatly exceed the values of the applied field $E_{APP}$ and in so doing induce a population inversion between different carrier states of motion which can be described according to quantum theory as superpositions of Landau states with very modest $E_{APP}$ values as seen by the following relationship $$E^2=E_{APP}^2(1+\omega_c^2\tau^2)$$

where

E=total field
$E_{APP}$=applied field, and
$\omega_c$ and $\tau$ are as defined previously.

Useful maser operation is achieved in the present invention using several different maser type resonator configurations, e.g., semiconfocal Fabry-Perot resonator, half-silvered plane parallel Fabry-Perot resonators, for simple DC pumping and plural resonance cavity configurations where RF electromagnetic energy is used to supply the DC E field pumping component. It is within the teachings of the present invention to operate at higher temperatures, e.g., at room temperature but the restriction of $$|\alpha|\omega_c\tau>1$$

must still be fulfilled.

Therefore an object of the present invention is the provision of a novel crossed field pumped cyclotron resonance type of solid state plasma maser.

A feature of the present invention is the provision of an anharmonic solid state plasma maser generator including crossed field DC pumping means for creating a population inversion between unequally spaced Landau levels of the maser vehicle.

Another feature of the present invention is the provision of a thin film solid state plasma maser including means for creating a population inversion between unequally spaced Landau levels by a crossed field DC pumping means having the applied E and $H_0$ fields lying in the major plane of the thin film.

Another feature of the present invention is the utilization of an RF pumping source to supply the E field pumping component for the solid state masers set forth in the above features.

Another feature of the present invention is the provision of an anharmonic solid state plasma maser utilizing a thin film maser vehicle provided with means for creating a population inversion between unequally spaced Landau levels by a crossed field DC pumping means having the pump E fields lying in the major plane of the thin film and the pump $H_0$ directed normal to the major plane of the thin film.

These and other features and advantages of the present invention will become more apparent upon a perusal of the following specification taken in conjunction with the accompanying drawings wherein.

and $$\frac{mU_o^2}{2\hbar\omega}$$

Figures 1, 2, 3, 4, 5, 6, 7, 8:
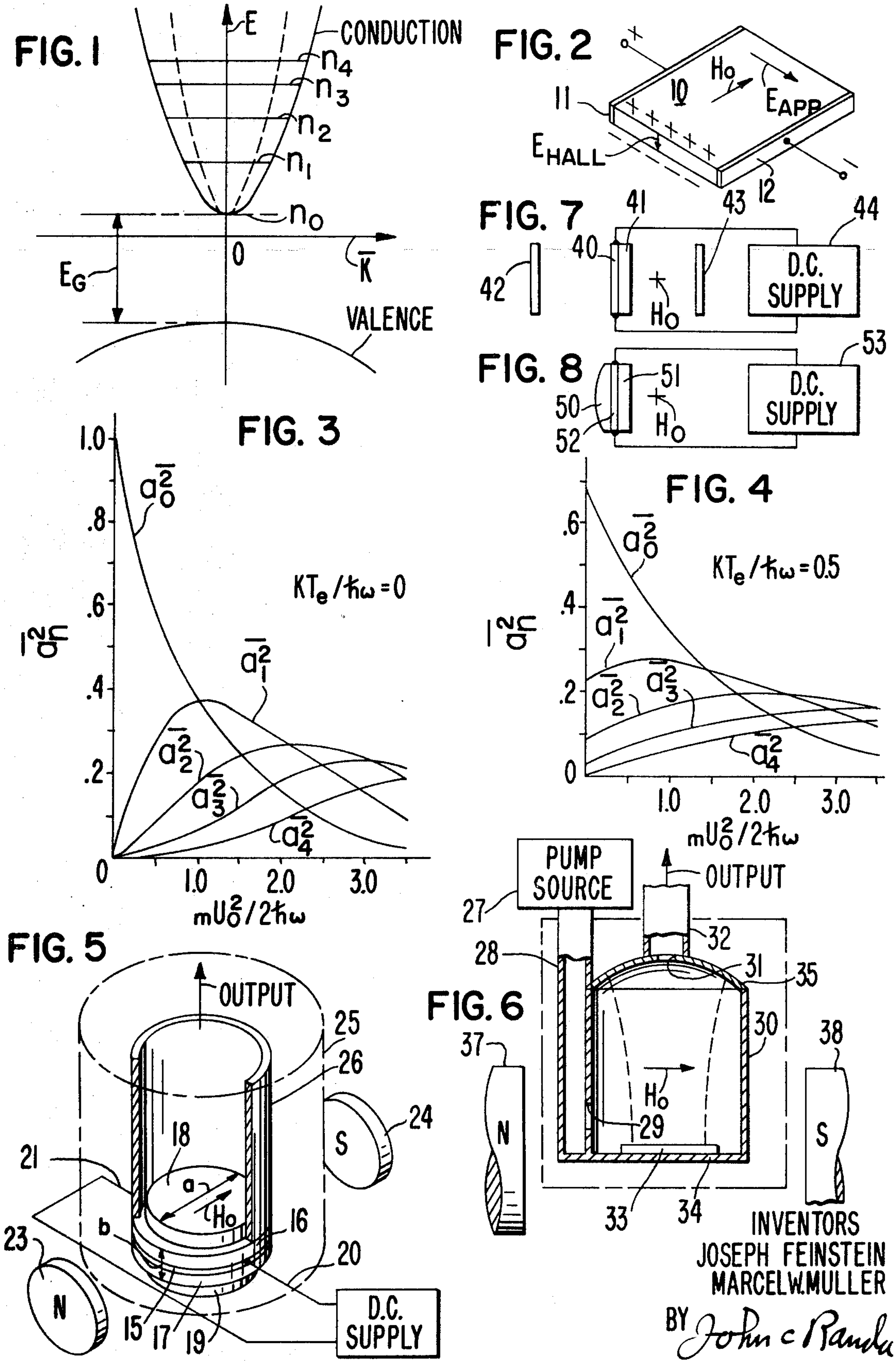
FIG. 1 is an illustrative graphical portrayal of an energy E vs. wave vector $\vec{K}$ band diagram for a hypothetical solid state maser vehicle.
FIG. 2 is a perspective view of a thin film solid state maser in a crossed DC pumping field.
FIGS. 3 and 4 are graphical portrayals of quantities $$\overline{a_n^2}$$

for different temperature conditions.

FIG. 5 is an embodiment of a DC pumped solid state maser using a thin film maser sandwiched between a pair of dielectric slabs which form an optical resonator.

FIG. 6 is an alternative embodiment of a DC pumped solid state maser using an RF generator to supply the E field pump component.

FIG. 7 is an embodiment of a maser utilizing a DC pumped thin film maser vehicle with the optical resonator formed by spaced parallel plane mirrors forming a plane parallel Fabry-Perot resonator.

FIG. 8 is an embodiment of an anharmonic maser utilizing a semiconfocal Fabry-Perot resonator formed from shaped dielectric elements one of which supports the thin film maser vehicle.

Turning now to FIG. 1 there is depicted an illustrative graphical portrayal of an energy band diagram for hypothetical semimetals or semiconductors. The solid curves labeled conduction and valence are generic representations of typical E vs. K relationships which are not of utility in the present invention. The solid curve labeled conduction is parabolic shaped and would thus have equally spaced Landau levels while the solid curve labeled valence although non-parabolic has a very small curvature which means the holes would have very large effective masses. The dotted curve in the conduction band region has a large curvature and is non-parabolic and thus is most useful according to the teachings of the present invention as representative of a suitable conduction band configuration for a solid state maser vehicle. The straight lines labeled $n_0$, $n_1$, $n_2$, etc., are representative of the ground state, first, second, etc., Landau levels for the dotted curve for a given applied $H_0$ field.

The conduction band structures of several semiconductors and semimetals, e.g., Bi, InSb, BiSb alloy, etc., are non-parabolic and have a large curvature in the vicinity of the band edges. The cyclotron resonance effective masses of carriers in these materials are small compared with the free electron mass and variable with energy, and the Landau levels are unequally spaced. As a consequence of the small effective mass the cyclotron resonance frequency in such a material can be quite large in moderate applied magnetic fields, being, for example, 200 mc./gauss in InSb as compared with 2.8 mc./gauss for free electrons. As a consequence of the unequal spacing of the Landau levels the carriers in such materials are capable of generating or amplifying coherent electromagnetic radiation at or near the cyclotron frequency if means can be found for inverting the populations of carriers in the Landau levels.

It is one purpose of the present invention to teach a simple "pumping" mechanism for accomplishing such population inversion. According to the invention, see FIG. 2, a steady magnetic field $H_0$ and an orthogonal steady or slowly varying (on the time scale of the cyclotron resonance period) electric field E are applied to the material, in a manner to be described in more detail below. Now it can be shown that carriers which make inelastic collisions, have states of motion which can be described according to quantum theory as superpositions of Landau states, and it can be shown further that for suitable values of the applied crossed magnetic and electric fields, these superpositions will contain population inversions. We have calculated the Landau level populations subsequent to such collisions as a function of the fields and of the temperature of the medium and have displayed the results of these calculations at two values of the temperature in FIGS. 3 and 4. The curves in these figures labeled $$\overline{a_0^2}, \overline{a_1^2}, \overline{a_2^2} \ldots$$

represent the fractional populations respectively in the ground, first excited, second excited . . . Landau level, as a function of the quantity $$\frac{m^*U_o^2}{2\hbar\omega}$$

where $m^*$ is the effective mass of the carriers,
$\omega$ is the angular cyclotron resonance frequency,
$\hbar$ is Dirac's constant, and
$U_o=E/H$ is the average crossed-field velocity of the carriers. A population inversion is generated between Landau levels $n$ and $n+1$ whenever the fractional population $$\overline{a_{n+1}^2}$$

is greater than the fractional population $$\overline{a_n^2}$$

when such an inversion is generated, the medium is suitable for generating or amplifying electromagnetic radiation at the cyclotron frequency corresponding according to Planck's law to the energy difference between the inverted Landau levels; this frequency, because of the small value of effective mass which is characteristic of the materials cited and several others, can lie in the range from microwaves through millimeter and submillimeter waves to the infrared for values of the magnetic field that can be conveniently generated by conventional magnetomotive force means, e.g., electromagnets, permanent magnets, or solenoids well known in the art. Moreover, since the energies of the Landau levels and hence the cyclotron frequency are functions of the magnetic field $H_o$, the frequency of generation and amplification of electromagnetic waves can be altered by adjusting the magnitude of the magnetic field $H_o$, thus permitting the operation of the device according to this invention as a tunable oscillator or amplifier.

It will be seen from FIGS. 3 and 4 that the achievement of a population inversion between two Landau levels requires, in general, that the quantity $$\frac{m^*U_o^2}{2\hbar\omega}$$

exceed some minimum value which can be read from these figures. This requires that for operation at some desired frequency the carriers in the medium be immersed in an electric field that exceeds some minimum value determined by the frequency and by the properties of the particular material that is being employed. In particular, the minimum required electric field increases for operation at higher frequencies, and consequently the current flowing through the material also increases, thus raising the undesirable generation of heat in the material. In order to prevent overheating of the material, and in order to facilitate operation according to the criterion explained above with the aid of FIGS. 3 and 4, it will be desirable to cool the device by immersion in cryogenic fluids such as liquid nitrogen or liquid helium and it may also be desirable to apply the electric field E in pulses short enough to prevent excessive heating according to practices well known in the art. In addition to these practices it is also a feature of this invention to reduce the required magnitude of applied electric field and the attendant current flow by an application of the Hall effect illustrated in FIG. 2. If the material used in the device is formed into the shape of a thin plate or film 10, with the electric field applied by means of electrodes 11, 12 attached to opposite edges of the film, and if the magnetic field is oriented orthogonal to the applied electric field and within the plane of the film, then the electric field in the interior of the film will be larger than the applied electric field, and its magnitude is given by the formula $$E^2=E_{APP}^2(1+w_c^2\tau^2)$$

where

E is the electric field in the interior of the film where acts on the carriers, $E_{APP}$ is the field applied by the electrodes, $\omega_c$ is the angular cyclotron frequency, and $\tau$ is the time between collisions of the carriers with lattice imperfections or phonons.

It should be understood that the enhancement of electric field expressed by the above formula will occur only in the planar thin film, plate, or slabs for the field geometry set forth above, and will be much reduced if the shape of the solid state medium and the orientation of the fields are altered.

The active solid state medium prepared according to the teaching of this invention will in general be associated with one of various types of structures to support and confine the high frequency electromagnetic field to be generated or amplified. It is intended that such structures may be electromagnetic resonators and circuits of the types used in microwave practice or of the quasi-optical types known in the art of optical masers.

In general materials which satisfy the following criteria may be utilized in anharmonic masers according to the teachings of the present invention. As discussed previously the maser material shall have low effective mass carriers which are preferably $$m^*<.02m_0$$

where $m_0$ is the rest mass value of an electron. This criteria permits minimization of $H_0$ field requirements for a given $\omega_c$ value. The material shall be characterized by a low loss or long lifetime such that $$\omega\tau\gg1 \text{ (preferably } >10)$$

The material shall exhibit a non-parabolic band structure to give unequally spaced Landau levels. The degree of which depends on $\tau$ and $\omega$ as set forth in the condition $$\gamma E_0\tau>1$$

The material shall have free carrier densities $n$ low enough to permit required lifetime and RF penetration of maser vehicle. This will be satisfied for semiconductors and semimetals having free carrier densities $$n<10^{+18}/\text{cm.}^3$$

and which in the case of semiconductors will have forbidden band gaps $E_g<.3$ ev. and high mobilities $\mu(>10^5$ cm.$^2$/volt. sec.). This of course includes the semimetals since they have overlapping bandstructures assuming they satisfy the other criteria set forth above.

Lower carrier densities will permit the utilization of thicker maser vehicles in the form of thin plates or slabs while higher carrier densities will restrict the maser vehicle to the thin film. The governing criteria being the RF propagation characteristics. The following correlations set forth the preferred carrier density ranges and sample thickness and give suitable exemplary materials for anharmonic masers. For samples of thickness in the .1 to 10 micron range, thin films, the free carrier densities should fall within the following range at the operating temperature of the maser:

$$10^{15}/\text{cm.}^3<n<10^{17}/\text{cm.}^3$$

The semimetal bismuth, Bi, satisfies this criteria by having suitable bandstructure and lifetime properties and $$n\sim10^{17}/\text{cm.}^3$$

The semiconductor alloy $Bi_{(1-x)}Sb_{(x)}$ with $.08<x<.2$ also satisfies this criteria since it has $n\sim10^{16}$/cm.$^3$. For samples of thicknesses >10 microns and thin plates or slabs up into the millimeter range, the free carrier densities should fall within the following range at the operating temperature of the maser:

$$10^{+12}/\text{cm.}^3<n<10^{+15}/\text{cm.}^3$$

The semiconductor InSb having a free carrier density $n\sim10^{+14}$/cm.$^3$ will satisfy our criteria since it has appropriate bandstructure and lifetime properties.

A single crystal B*i* thin film will be useful with either the trigonal or binary axis in the plane of the film or normal thereto. However, if Hall effect enhancement is dispensed with and the trigonal axis is normal to the major plane of the thin film $H_0$ pump fields disposed normal to the major plane of the thin film can be used. This will produce excitation of all carriers in the Bi film but the average effective mass $m^*$ will be higher. If the binary axis of Bi lies in the major plane of the thin film and Hall effect enhancement is desired $H_0$ will be oriented in the major plane. Only ⅔ of the carriers will be excited at the operating frequency but these will be of lowest effective mass $m^*$.

The following threshold conditions are presented to aid those skilled in the art in arriving at a better understanding of the more esoteric aspects of the present invention as well as achieving a better appreciation of the relative magnitudes of the involved parameters.

THERSHOLD ESTIMATES

Theoretical estimates of the threshold for the production of negative resistance are presented herein for idealized cases. For finite temperature carriers, inversion first occurs when $$\frac{mU_o^2}{2\hbar\omega}>1+\frac{kT_e}{\hbar\omega} \quad (1)$$

where $\omega=\omega_c$ $T_e$=electron temperature $U_o$=drift velocity in the crossed field $\hbar$=Planck's constant/$2\pi$ $k$=Boltzmann constant.

The anharmonicity criterion is applied by making the natural identification of $E_0$, the classical carrier energy, with the quantum mechanical expectation value of the energy. This calculated value for the finite-temperature distribution, can be calculated by using one of the generating functions for the Laguerre polynomials.

$$\sum_{n=0}^{\infty} L_n(-x)z^n = \frac{z}{1-z} e^{\frac{z}{1-z}x} \quad (2)$$

where $$x = \frac{\gamma^4 U_o^2}{\gamma^2 + \beta}$$

and $$\beta = \frac{m^*}{2\hbar\omega}$$

with $$z = \frac{\beta}{\gamma^2 + \beta}$$

and $$\gamma^2 = \frac{m^*}{2\hbar T_e}$$

$L_n$=Laguerre polynomial with this result we obtain, $$\frac{E_o}{\hbar\omega} = \frac{1}{\left(1+\frac{kT_e}{\hbar\omega}\right)} \left[\frac{mU_o^2}{2\hbar\omega} + \frac{kT_e}{\hbar\omega}\left(1+\frac{kT_e}{\hbar\omega}\right)\right] \quad (3)$$

to be used in the threshold equation $$|\alpha| E_o \tau > 1 \quad (4)$$

This value for the classical energy is probably an overestimate for our purposes. The second term in the energy expression arises from the "tail" of the Maxwellian distribution which represents uninverted populations and which does not contribute to the negative resistance. Thus we shall omit this second, optimistic, term and use $$E_o = mU_o^2/2\hbar\omega \left(1+\frac{kT_e}{\hbar\omega}\right) \quad (5)$$

In translating these criteria into requirements for the applied "pumping" field it should be remembered that the internal field E in which the carriers move is not identical with the applied electric field $E_a$. Because of the Hall effect there is an additional field which may be thought of as generated by the surface charges arising from the motion in the crossed electric and magnetic fields. Since this additional field has the nature of a depolarizing field, it is in general non-uniform both in magnitude and direction. However if the sample is a thin film or slab electroded on its narrow edges, and if the magnetic field is in the plane of the film, the internal field is uniform and has its maximum value, given by $$E^2 = E_a^2(1+\omega_c^2\tau^2) \quad (6)$$

If $\omega_c\tau \gg 1$, the drift velocity $U_o = E/H$ is nearly parallel to the plane of the film.

Using this value of the internal field, the threshold value of applied field to obtain inversion is $$E_a^2 > \frac{2m\hbar\omega^3\left(1+\frac{kT_e}{\hbar\omega}\right)}{e^2(1+\omega_c^2\tau^2)} \quad (7)$$

and the applied field required to satisfy the anharmonicity criterion is given by $$E_a^2 > \frac{m\omega\left(1+\frac{kT_e}{\hbar\omega}\right)E_G\left(1+\frac{2E_F}{E_G}\right)}{e^2\tau(1+\omega_c^2\tau^2)} \quad (8)$$

where $E_F$=Fermi Level
$E_G$=Forbidden Band Gap.

Both inequalities must be satisfied in order to generate negative resistance. Inspection of the inequalities shows that the first becomes more difficult to satisfy with increasing frequency, the second easier. Since we are primarily interested in an upper frequency limit, we can define a highest frequency for which the first inequality can be satisfied for a given value of applied field. Assuming $$kT_e \lesssim \hbar\omega$$

and $$\omega\tau > 1$$

we find, for the shortest wavelength for inversion $$\lambda > \frac{1.4\times10^{-17}}{E_a\tau^2}\frac{m^*}{m} \text{ (m.k.s.)} \quad (9)$$

which, for the values of effective mass (~.01–.02 m.) and applied fields of $10^5$ (1 kv./cm.) can be satisfied deep into the submillimeter region ($\lambda$=.03 mm.) for relaxation times as short as $\tau \sim 10^{-12}$ sec. longer lifetimes in bismuth are achievable. For example, $\tau \simeq 10^{-11}$ sec. at 80° K. is quite reasonable in view of the observed lifetime of greater than $10^{-9}$ sec. at 4° K. This would allow an order of magnitude reduction in required applied electric field.

If the criterion for inversion is satisfied, the anharmonicity criterion can be expressed in very simple form by substituting Eq. 7 and 8.

$$f^2(\hbar\omega)(\omega\tau) > \frac{1}{2}E_G + E_F \quad (10)$$

where $f$ is the factor by which our applied field exceeds the threshold field at a given $\lambda$, or by which the operating wavelength exceeds the minimum specified by Eq. 9.

In all cases $\omega$ is assumed equal to $\omega_c$.

In bismuth, where $E_G$=.015 ev., $E_F$=.025 ev., this corresponds to a requirement of $\omega\tau \sim 30$ at $\lambda$=1 mm. for $f$=1 and correspondingly less at shorter wavelengths. Note that the threshold field in this case is only 5 volts/cm. In indium antimonide, InSb, with $E_G$=.23 ev., $E_F$=0, we want $\omega\tau \sim 10^2$ even for $\lambda$=1 mm.

The quantitative results of this section indicate that a DC dumped cyclotron resonance maser employing bismuth is operable at room temperature int he submillimeter wave band. At lower temperatures these equations predict that a negative resistance is attainable from a wavelength of a few millimeters down to tens of microns.

Turning now to FIG. 5 there is depicted a preferred embodiment of the present invention which includes a thin film 15 of the active maser medium sandwiched between a pair of dielectric slabs 16, 17 as of quartz, sapphire by way of example. This configuration takes the form of a plane parallel Fabry-Perot resonator when the outer dielectric surfaces are silvered for total reflection, silver coating 19, and partial reflection silver coating 18, in a manner well known in the art. The silver coatings are exaggerated for clarity. The thin film active maser medium, e.g., single crystal Bi, can be deposited by chemical vapor deposition on one of the dielectric cylinders and is selected to lie at an anti-node of the electric field pattern of the resonator to maximize coupling. For an example of how to prepare thin films of single crystal Bi by vacuum deposition see "Texture and Orientation of Evaporated Bismuth Films" by T. P. Turnball and E. P. Warekois, vol. 15. Proc. of the Conf. in Metallurgy of Semiconductor Materials, Los Angeles, 1961. The thin film maser vehicle is provided with suitable DC leads 20, 21 and coupled to a DC power supply, e.g., a pulse source or battery. A magnetomotive force supply, e.g., solenoid, electromagnetic, etc. as represented by poles 23, 24 is used to supply the desired $H_o$ field through the maser vehicle in orthogonal relationship with the $P_{APP}$. As indicated previously the maser is preferably immersed in a low temperature environment such as Dewar 25 which is representative of any conventional Dewar filled with liquid nitrogen, helium, etc. A pipe such as 26 may be provide to remove the maser electromagnetic wave energy emanating through the partially silvered mirror 18 as indiciated.

The maser operating mode energy will be well confined between the mirrors 18 and 19 if the ratio $$a^2/b\lambda$$

(where $a$ is mirror diameter, $b$ is mirror separation, $\lambda$ is operating wavelength), is sufficiently large, e.g., >10 which will permit introduction of DC leads 20, 21 at the edges of the film without affecting the $Q_0$ (resonator Q of operating mode).

The maximum usable film thickness may be estimated from the field attenuation equation in overdense media:

$$\frac{E}{E_0}=\exp\left[-\frac{2\pi}{\lambda}\cdot\sqrt{\left(\frac{\omega_p}{\omega}\right)^2-1}\right]z,\ \omega_p{}^2=\frac{ne^2}{\epsilon m^*}$$

$\omega_p$=the plasma frequency
$n$ is carrier density
$E_0$=incident electric field on film of $z$ thickness
$m^*$ is determined around Fermi level for design purposes
$E/E$=transmitted electric field through film of $z$ thickness
$\lambda$=operating wavelength
$\epsilon$=permittivity of medium.

For $\omega_p/\omega \gg 1$, our present case, this reduces to $$\exp\ (-2\pi z/\lambda_p)$$

independent of the operating frequency. The bracketed portion of the exponent should not exceed 1 for useful results. Since the plasma wavelength for bismuth is a few microns, the film thickness should be of the order of one micron as previously given to represent a small perturbation to the wave in the resonator. It should be noted that this reactive type field decay equation is appropriate rather than the resistive skin depth formula when $\omega\tau \gg 1$. The physical situation with this type of geometry is that of a sufficiently small total number of free charges to avoid affecting the resonator field pattern even though the charge carrier density within the material has its usual high value.

The thin film device permits the attainment of very high current density (of order thousands of amperes/cm.$^2$) with relatively modest total current (of order one ampere for the micron thickness). As a result of the strong magneto-resistance effect in bismuth and the presence of the magnetic field necessary for cyclotron resonance, the DC electric field necessary to establish this current is considerably higher than at zero $H_0$, the exact value depending upon $H_0$ through the cyclotron resonance relation. The Hall effect then enters to increase the transverse electric field seen by the carrier as compared to the applied field by the factor $\omega_c\tau$.

A second advantage of the centered thin film geometry is the more effective coupling obtained with the fields of the millimeter wave resonator. This may be expressed in terms of coupling impedance, and corresponds by analogy to the electron beam in vacuum maser to the injection of charges into the region of maximum electric field of the cavity. The equivalent in the solid state case is the positioning of the film at a plane of maximum electric field in the Fabry-Perot resonator as shown in FIG. 5. The resultant improvement in coupling impedance over the case of the active material constituting the cavity wall is the ratio of dielectric loaded free space impedance $(\sqrt{\mu/\epsilon})$ compared to reactive skin depth impedance (increased by the present of the magnetic field). This ratio is about $10^4$ and much more than makes up for the reduction in total number of coupled charges which results from the thin film geometry.

In FIG. 6 an RF pump source 27 coupled via guide 28 through iris 29 is used to supply RF pump power to a dual resonant cavity 30 in the form of a semi-confocal Fabry-Perot resonator. The RF is at a frequency much lower than the maser operating frequency and is thus an effective DC pump for supplying the $E_{APP}$ component of the DC crossed field. The pole pieces 37, 38 represent a suitable magnetomotive force supply means for providing the orthogonal $H_0$ component as discussed previously. An X-band RF pump source 27, e.g. a klystron is suitable.

The pump frequency should be high enough that the skin depth for the pump is small thus reducing pump power but not so high as to make the generation of the pump power difficult. The cavity 30 is designed to resonate in a $TM_{110}$ mode for the X-band power and the maser energy is confined to the pattern denoted by the dotted lines and is extracted via iris 31 in curved end wall 35 and output guide 32. The cavity 30 can be tuned in any conventional manner with respect to its X-band resonant frequency without affecting the maser frequency as long as the spacing between end mirrors is maintained constant. A maser vehicle 33 is disposed on the planar wall 34 of the resonator as shown in the form of a thin plate or slap geometry of e.g. single crystal InSb. For the slab case where RF is used to pump the vehicle the intermetallic semiconductor InSb having densities $n$ of less than $10^{+15}$/cm.$^3$ is suitable while high conductivity semimetals such as Bi are not suitable maser vehicles.

In FIG. 7 another embodiment of the present invention is depicted which utilizes the thin film approach. The maser thin film 40 is vapor deposited on a substrate 41 of sapphire or other material which is transparent to the electromagnetic operating band of the maser. The pump $H_0$ field is disposed in the plane of the film as shown and the optical resonator is formed by a pair of spaced end mirrors 42, 43 which form a standard plane parallel Fabry-Perot optical resonator. The orthogonal E pump field is supplied by a DC supply 44. One or both of the end mirrors may be made axially adjustable for optimizing the coupling between the thin film and the electromagnetic field pattern generated in the resonator. The advantages of this approach lie in the ease of adjustment for obtaining optimum coupling. Again the maser is preferably immersed in a cooling medium as previously discussed.

In FIG. 8 the optical resonator is a semiconfocal Fabry-Perot resonator formed from a pair of sapphire or the like blocks 50, 51 one of which forms the substrate upon which the maser thin film 52 is vapor deposited. Again DC supply e.g. 53 is coupled to the device as shown and cooling is preferably provided. In any of the thin film embodiments depicted herein the $H_0$ pump field may be oriented normal to the major plane of the thin film maser vehicle if the Hall effect enhancement can be sacrificed. The Hall effect will be present but its effect will be relatively insignificant and will not destroy the orthogonal inter-relationship of the resultant E field and the $H_0$ applied field.

Since many changes could be made in the above construction and apparently many different embodiments could be arrived at without departing from the scope thereof, it is intended that all matters contained in the above description or shown in the accompanying drawings will be interpreted as illustrative and not in a limiting sense.

What is claimed is:

1. A solid state plasma maser device comprising:

a thin solid state active medium selected from the group consisting of semi-metals and semi-conductors which are characterized by having a non-parabolic band structure with a curvature near the bottom thereof such that the effective mass of the carrier electrons are less than the mass of equivalent free carriers;

means for applying an H-field across the thin active medium generally oriented in the major plane thereof for determining the operating frequency of the device by defiining energetically discrete unequally spaced Landau levels for the conductive electrons in the active medium; and means for applying an E-field across the thin active medium generally oriented in the major plane thereof and perpendicular to the H-field which interacts with the H-field (the Hall effect) causing a charge differential to develop across the major surfaces of the active medium which establishes a Hall effect E-field perpendicular to the major plane of the active medium, the active medium being sufficiently thin to cause the Hall effect E-field to be substantially greater than the applied E-field which combines with the Hall effect E-field to establish an internal E-field for creating a population inversion (negative temperature state) between at least two of the unequally spaced Landau levels for supporting stimulated emission of electromagnetic energy.

2. The plasma maser device of claim 1 wherein the means for applying the E-field is a DC source and the means for applying the H-field is a magnetomotive supply.

3. A solid state plasma maser device of claim 1 wherein the stimulation emission of electromagnetic energy has an angular operating frequency corresponding to $$\omega=\omega_c=\frac{eH_o}{m^*c}$$

occurs where $e$ = electron charge, $m^*$ = effective mass of carrier electrons in the maser device as determined at the operating temperature of the device, $H_o$ = magnetic field strength, $c^o$ = speed of light.

4. The solid state plasma maser device of claim 1 wherein the H-field may be varied to cause the spacing between the unequally spaced Landau levels in the active medium to vary for varying the operating frequency of the device.

5. A solid state plasma maser device for generating coherent electromagnetic wave energy comprising:

a thin film solid state active medium deposited upon a dielectric substrate forming an optical resonator, the active medium selected from the group consisting of semi-metals and semiconductors characterized by having a nonparabolic conduction band structure with a curvature near the bottom thereof such that the effective mass of the carrier electrons are less than the mass of equivalent free carriers;

means for applying an H-field in the major plane of the active medium for defining energetically discrete unequally spaced Landau levels for the conduction electrons in the active medium which determines the operating frequency of the device; and means for applying an E-field in the major plane of the active medium and orthogonal to the H-field, the interaction between the E-field and the H-field (the Hall effect) causing a charge to develop which establishes a second E-field, the second E-field combining with the applied E-field to establish an internal E-field which is greater than the applied E-field and which creates a population inversion (negative temperature state) between at least two of the unequally spaced Landau levels for supporting stimulated emission of electromagnetic energy.

6. The solid state plasma maser device of claim 5 wherein the thin film active medium is sandwiched between two dielectric slabs, the two dielectric slabs each having one of their outer surfaces mirrored to provide a plane parallel plate resonator with the thin film active material lying in an anti-node of the E-field pattern of the resonator at the operating frequency of the device.

7. The solid state plasma maser device of claim 6 wherein the active medium is a thin film of bismuth having a thickness of from about .1 micron to about 10 microns.

8. The solid state plasma maser device of claim 7 wherein the wavelength of the operating frequency is from about 10 microns to about 10 millimeters as determined by the unequally spaced Landau levels and the applied magnetic field.

References Cited

UNITED STATES PATENTS

| | | | |
|---|---|---|---|
| 3,002,156 | 9/1961 | Boyle et al. | 330—4 |
| 3,201,708 | 8/1965 | Burstein | 330—4 |
| 3,265,977 | 8/1966 | Wolff | 330—4.3 |
| 3,368,161 | 2/1968 | Hensel | 330—4 |

ROY LAKE, Primary Examiner

D. R. HOSTETTER, Assistant Examiner

U.S. Cl. X.R.

330—4, 4.3; 331—94.5